US008646338B2

(12) United States Patent
Taddia

(10) Patent No.: US 8,646,338 B2
(45) Date of Patent: Feb. 11, 2014

(54) HYDRAULIC SECTION FOR LOAD SENSING APPLICATIONS AND MULTIPLE HYDRAULIC DISTRIBUTOR

(75) Inventor: Luca Taddia, Modena (IT)

(73) Assignee: Bucher Hydraulics S.p.A., Reggio Emillia (IT)

( * ) Notice: Subject to any disclaimer, the term of this patent is extended or adjusted under 35 U.S.C. 154(b) by 12 days.

(21) Appl. No.: 13/058,147

(22) PCT Filed: Feb. 2, 2010

(86) PCT No.: PCT/IT2010/000033

§ 371 (c)(1), (2), (4) Date: Feb. 8, 2011

(87) PCT Pub. No.: WO2011/096001

PCT Pub. Date: Aug. 11, 2011

(65) Prior Publication Data

US 2012/0144926 A1 Jun. 14, 2012

(51) Int. Cl.
*G01N 3/02* (2006.01)

(52) U.S. Cl.
USPC .......... 73/856

(58) Field of Classification Search
USPC .......... 73/856
See application file for complete search history.

(56) References Cited

U.S. PATENT DOCUMENTS 4,574,839 A * 3/1986 Yeh et al. .......... 137/614.16
5,138,837 A 8/1992 Obertrifter et al.
5,161,373 A * 11/1992 Morikawa et al. .......... 60/484
5,460,000 A 10/1995 Kropp
5,890,362 A * 4/1999 Wilke .......... 60/427
6,098,403 A * 8/2000 Wilke .......... 60/427
6,289,675 B1 9/2001 Herfs et al.
6,367,365 B1 * 4/2002 Weickert et al. .......... 91/447
7,146,808 B2 * 12/2006 Devier et al. .......... 60/422
7,395,662 B2 * 7/2008 Kauss .......... 60/399
7,628,174 B2 * 12/2009 Kauss et al. .......... 137/625.69
2010/0176324 A1 7/2010 Busani

FOREIGN PATENT DOCUMENTS

DE 4005967 A1 8/1991
DE 19703997 A1 8/1998
GB 2271870 A 4/1994
WO 2009001377 A1 12/2008

* cited by examiner

*Primary Examiner* — Lisa Caputo
*Assistant Examiner* — Octavia D. Hollington
(74) *Attorney, Agent, or Firm* — Pearne & Gordon LLP

(57) ABSTRACT

Hydraulic section (1) including: a main spool (2);a pressure compensator (40;4) able to maintain a substantially constant pressure drop through a metering orifice (3) of the main spool (2); a first chamber (7) interposed between the main spool (2) and a first end (16*a*) of the compensator (40;4) and a second chamber (6) situated at a second end (16*b*) of the compensator (40;4), the second chamber (6) being connectable to a feed line (Pal) from a pump (100) by a predefined channel (Pp) in such a way that said hydraulic section (1) operates as a priority section, and being connectable to a line (LS) for detecting the highest load pressure in such a way that the hydraulic section (1) operates as a flow-sharing section.

17 Claims, 6 Drawing Sheets

HYDRAULIC SECTION FOR LOAD SENSING APPLICATIONS AND MULTIPLE HYDRAULIC DISTRIBUTOR

TECHNICAL FIELD AND BACKGROUND ART

The present invention has as its subject a hydraulic section for load sensing applications, and a multiple hydraulic distributor using one or more such hydraulic sections.

A load sensing hydraulic system allows the pressure drop to be maintained substantially constant through a metering orifice of the spool valve of a hydraulic section. As is well-known, a load sensing hydraulic system has application in operating machines which require the simultaneous performance of a plurality of movements. Consider an operating machine with a rotating turret such as, for example, an excavator or a telescopic loader, in which the rotation of the cabin, the extension of the arm and the movement of the bucket are managed independently of each other.

In a load sensing hydraulic system of traditional type, a request for more flow than the maximum deliverable by the pump is followed by the slowing or stoppage of the user with the highest load. This situation would prove particularly critical in the case quoted above, of the operating machine with a rotating turret, because the rotation of the cabin, rather than the extension of the arm, or rather than the movement of the bucket, could stop all of a sudden.

To overcome this problem, distributors of flow-sharing type have been developed, where a request for more flow than the maximum deliverable by the pump is followed by a proportional reduction of the flow to all the users. Although all the users function simultaneously, irrespective of the flow delivered by the pump, there are some applications where the proportional reduction of the flow to some users could compromise the correct operability of the machine. With reference to the operating machine with rotating turret, the speed of rotation of the cabin could undergo numerous oscillations due to the repeated occurrence of conditions of undersupply (or saturation) and restoration of normal conditions of flow, posing considerable problems of control and safety for the operator in the cabin.

It would thus be necessary to make the section corresponding to the critical user (i.e. rotation of the cabin) a priority section with respect to the other sections.

By ‘priority section’ we mean a section which, in conditions of saturation of the flow, does not participate in the proportional reduction of the flow delivered but maintains a constant flow, forcing the other sections to further reduce their flow.

An example of these hybrid solutions is shown in the document GB2271870, which describes a hydraulic system comprising at least one priority section and a plurality of flow-sharing sections. In particular, each flow-sharing section is provided with at least one pressure compensation element and is able to actuate a proportional reduction of flow in case of undersupply (or saturation). In this way, the movement of the machine actuated by means of the priority section does not undergo variations in speed in case of saturation, as happens however with movements whose control is entrusted to the flow-sharing sections. Another similar solution is the one described in the document WO2009/001377.

The main disadvantage of hybrid solutions is connected with the constructional complexity of distributors, which use two types of section with different structures (flow-sharing and priority). In fact, as is clearly visible in document WO2009/001377, the compensation means used in the two types of section are structurally different from each other.

This obviously entails longer times and higher costs for design and production than those necessary for the design and production of a load sensing system of traditional type or a load sensing system of flow-sharing type. Add to this the production costs of different moulds for the flow-sharing and priority sections.

Furthermore, hybrid distributors tend to be very bulky because the flow-sharing sections and the priority sections are difficult to accommodate side by side because of the different configurations of the internal channels.

Another problem which can occur in operating machines is that of reverse flow from the workports to the pump feed line which can cause undesired lowering of the load in the initial stage of lifting operations or undesired movements of the users. The expert in the field knows that to eliminate reverse flow, suitably configured non return valves are required, which further complicate the structure of the hydraulic section.

In this context, the technical task at the root of the present invention is to propose a hydraulic section for load sensing applications and a multiple hydraulic distributor which will overcome the disadvantages of the known art cited above.

DISCLOSURE OF THE INVENTION

In particular, it is an object of the present invention to make available a hydraulic section for load sensing applications which is universal, i.e. usable both as a flow-sharing and as a priority section.

Another object of the present invention is to make available a hydraulic section for load sensing applications which is structurally simpler, and therefore cheaper, than hydraulic sections in the known art.

A further object of the present invention is to propose a hydraulic section for load sensing applications in which reverse flow from the workports to the feed line is eliminated, or reduced as far as possible.

Another object of the present invention is to make available a multiple hydraulic distributor having a simplified and more compact structure by comparison with hydraulic distributors in the known art.

The declared technical task and the specified objects are substantially achieved by a hydraulic section for load sensing applications and a multiple hydraulic distributor, comprising the technical characteristics set forth in one or more of the attached claims.

BRIEF DESCRIPTION OF DRAWINGS

Further characteristics and advantages of the present invention will become clearer from the indicative, and therefore non-limiting, description of a preferred but not exclusive embodiment of a hydraulic section for load sensing applications and a multiple hydraulic distributor, as illustrated in the attached drawings, in which.

BEST MODE FOR CARRYING OUT THE INVENTION

Figure 5:
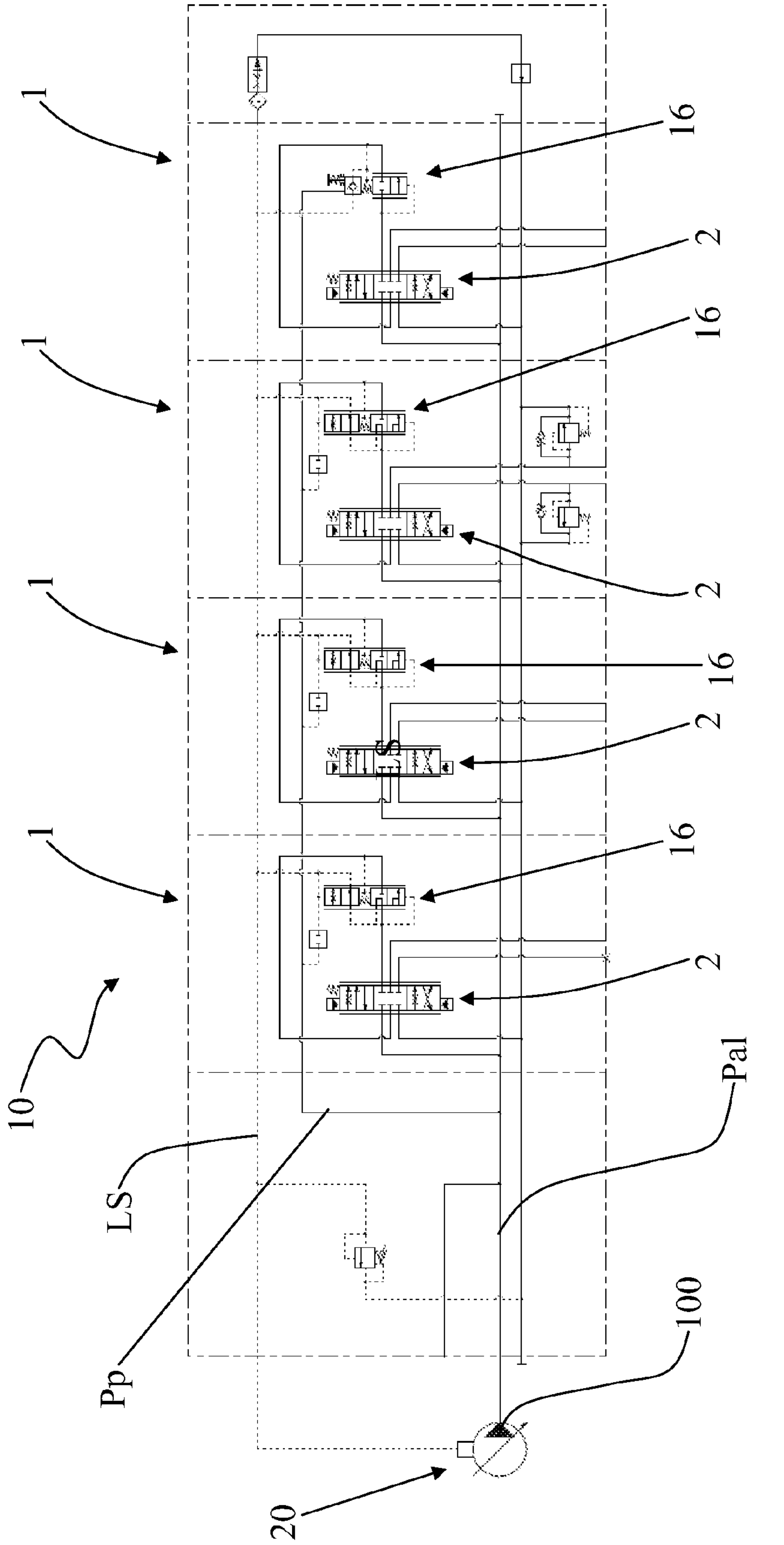
FIG. 5 illustrates the scheme of a multiple hydraulic distributor, according to the present invention.
Figure 6:
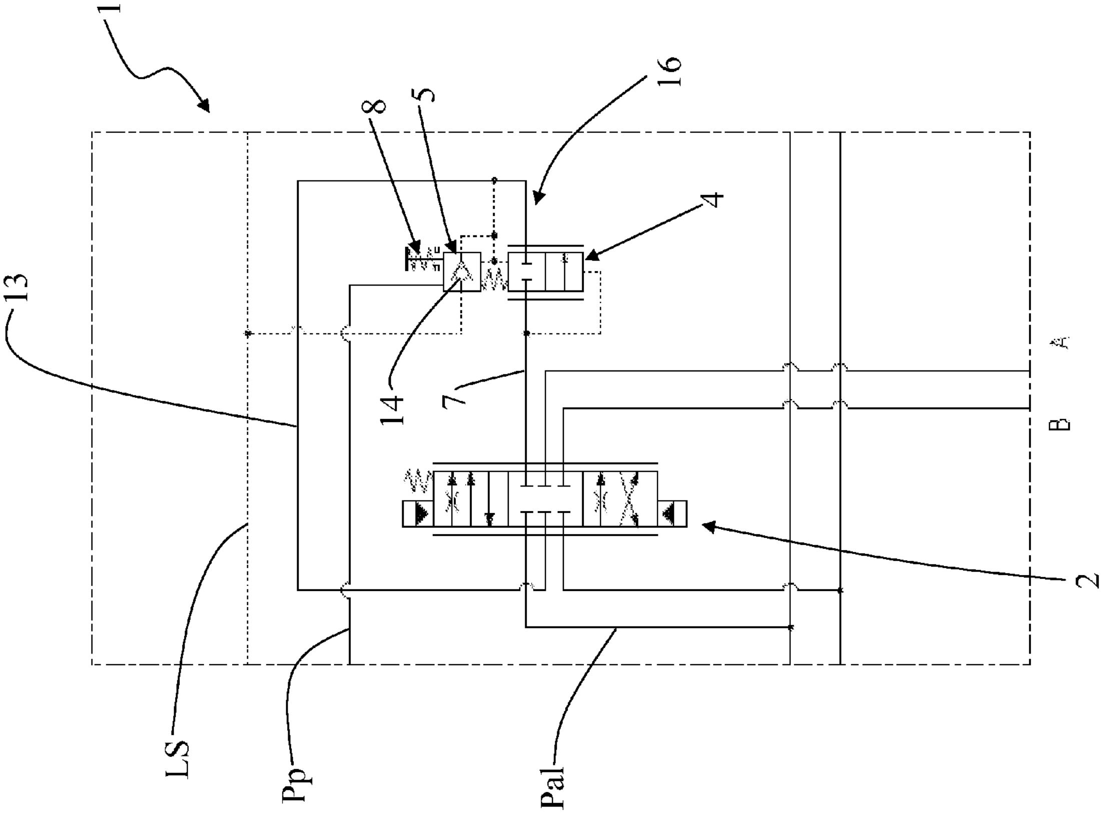
FIG. 6 illustrates an enlarged detail of the distributor of FIG. 5, in schematic view.

With reference to FIG. 5, no. 10 indicates a multiple hydraulic distributor comprising a plurality of hydraulic sections 1 for load sensing applications. At least one of the hydraulic sections 1 is a priority section, while the other hydraulic sections 1 are flow-sharing sections.

With reference to FIGS. 1 to 4, each hydraulic section 1 comprises a main spool 2 longitudinally displaceable within said section 1 in order to selectively transmit pressurised hydraulic fluid coming from a feed line Pal from a pump 100 to workports A,B through a metering orifice 3. In the embodiments here described and illustrated, the main spool 2 is of the six-way three-position type. It is anyway possible to create other configurations, for example four-position, where the additional position, called floating, connects both workports A, B to discharge. In particular, the main spool 2 is fed by a channel which coincides with the feed line Pal from the pump 100.

Downstream of the main spool 2 pressure compensation means 16 are provided, able to maintain a substantially constant pressure-drop through the metering orifice 3. A first chamber 7 is interposed between the main spool 2 and a first end 16*a* of compensation means 16. A second chamber 6 is situated at a second end 16*b*, opposite the first end 16*a*, of said compensation means 16.

Figure 2:
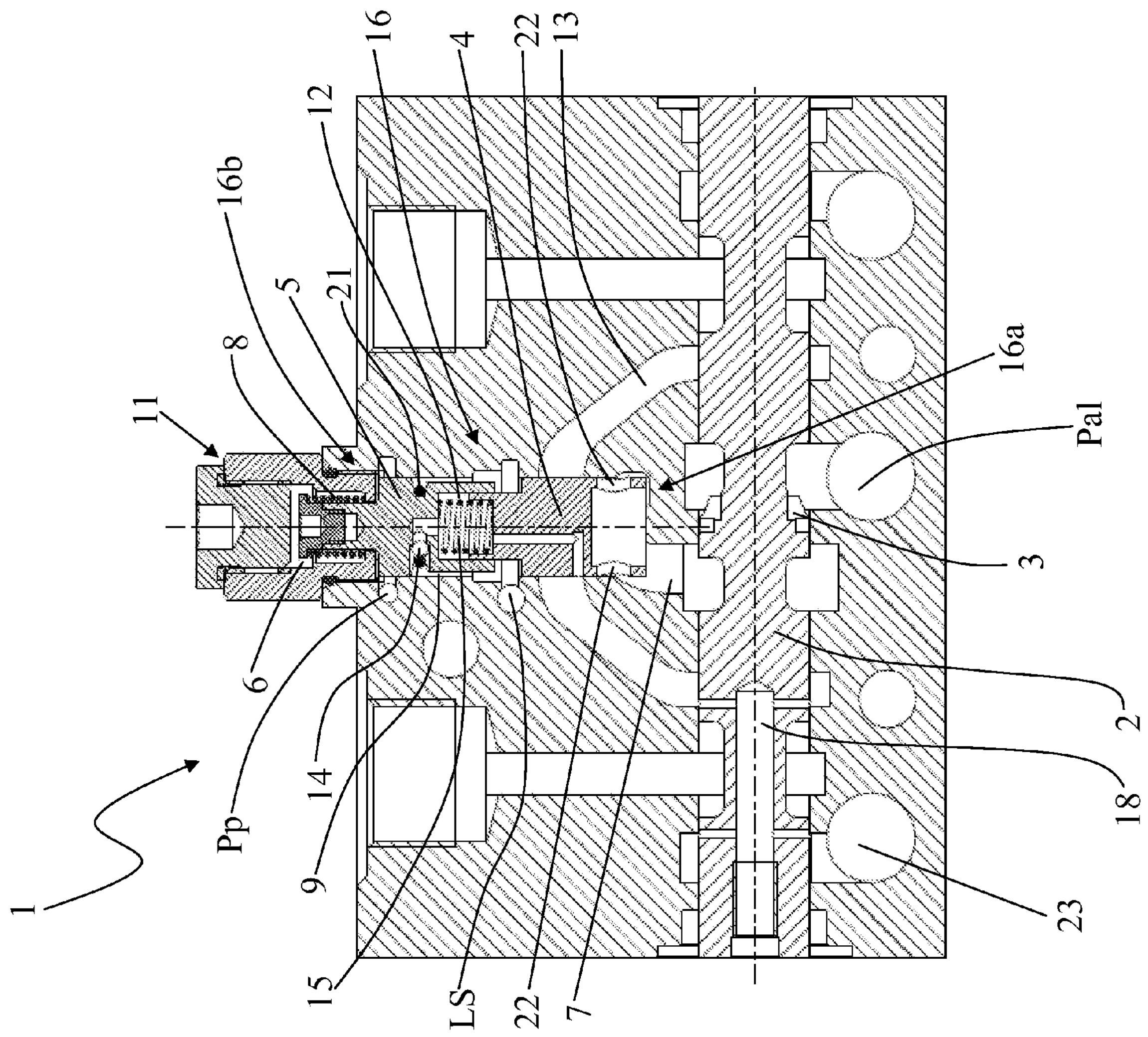
Figure 3:
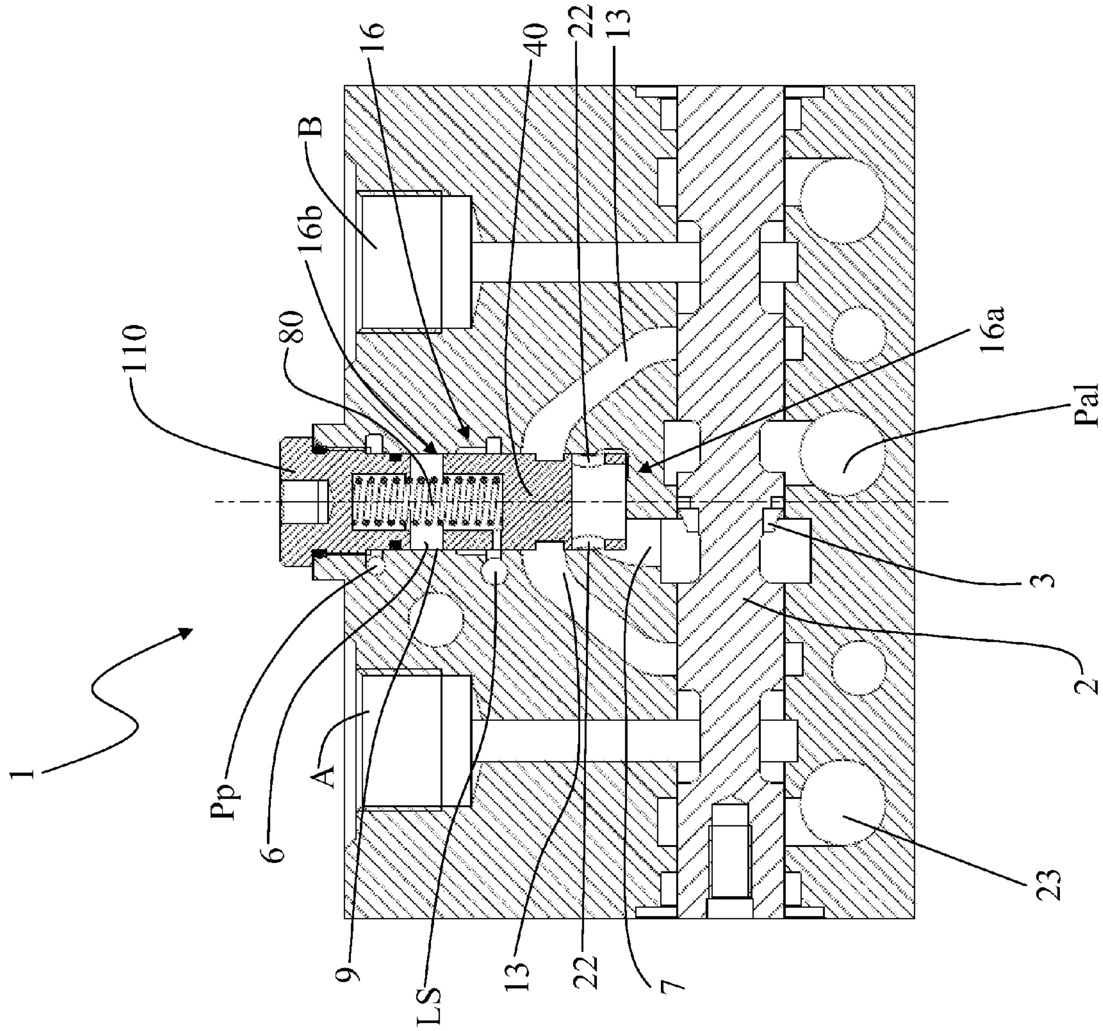
FIGS. 3 and 4 illustrate two different embodiments of a flow-sharing hydraulic section for load sensing applications, according to the present invention, in sectioned view.
Figure 4:
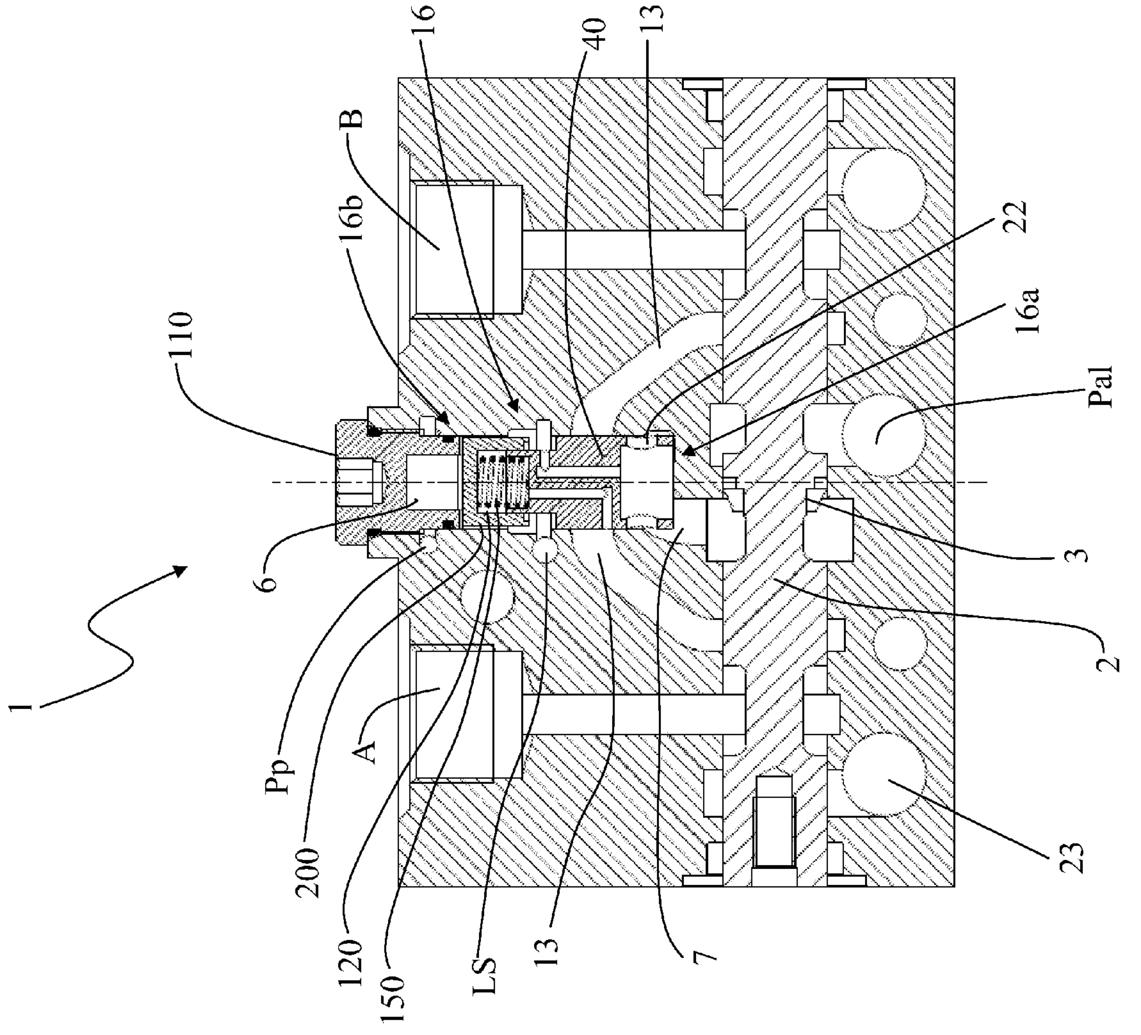

Originally, the said second chamber 6 is connectable to the feed line Pal by means of a predefined channel Pp in such a way that the hydraulic section 1 operates as a priority section (FIGS. 1 and 2), and it is connectable to a line LS for detecting the highest load pressure so that said hydraulic section 1 operates as a flow-sharing section (FIGS. 3 and 4). In both cases the predefined channel Pp and the line LS for detecting the highest load pressure are isolated from each other.

With reference to FIGS. 3 and 4, a description in more detail is given below of the structure of a flow-sharing hydraulic section 1, especially as it relates to the compensation means 16. The compensation means 16 comprise a pressure compensator 40 housed in a bore 9 formed within the hydraulic section 1. To close this bore 9 a plug 110 is provided which, interfacing with the walls of the bore 9 into which it is inserted, forms the second chamber 6. In particular, FIG. 3 illustrates a first embodiment (called "without check function") of the flow-sharing hydraulic section 1. As may be seen, a spring 80 is preferably housed in the second chamber 6 to elastically couple the compensator 40 and the plug 110. The predefined channel Pp, though crossing the flow-sharing hydraulic section 1, remains unused because it is isolated by a portion of the plug 110. In this way, communication is excluded between this predefined channel Pp and the second chamber 6.

FIG. 4 illustrates a second embodiment (called "with check function") of the flow-sharing hydraulic section 1. In it, between the pressure compensator 40 and the plug 110 an intermediate element 200 is interposed which faces said plug 110. In particular, the pressure compensator 40 and the intermediate element 200 are facing each other in such a way as to form an intermediate chamber 120 in which a spring 150 is housed.

Figure 1:
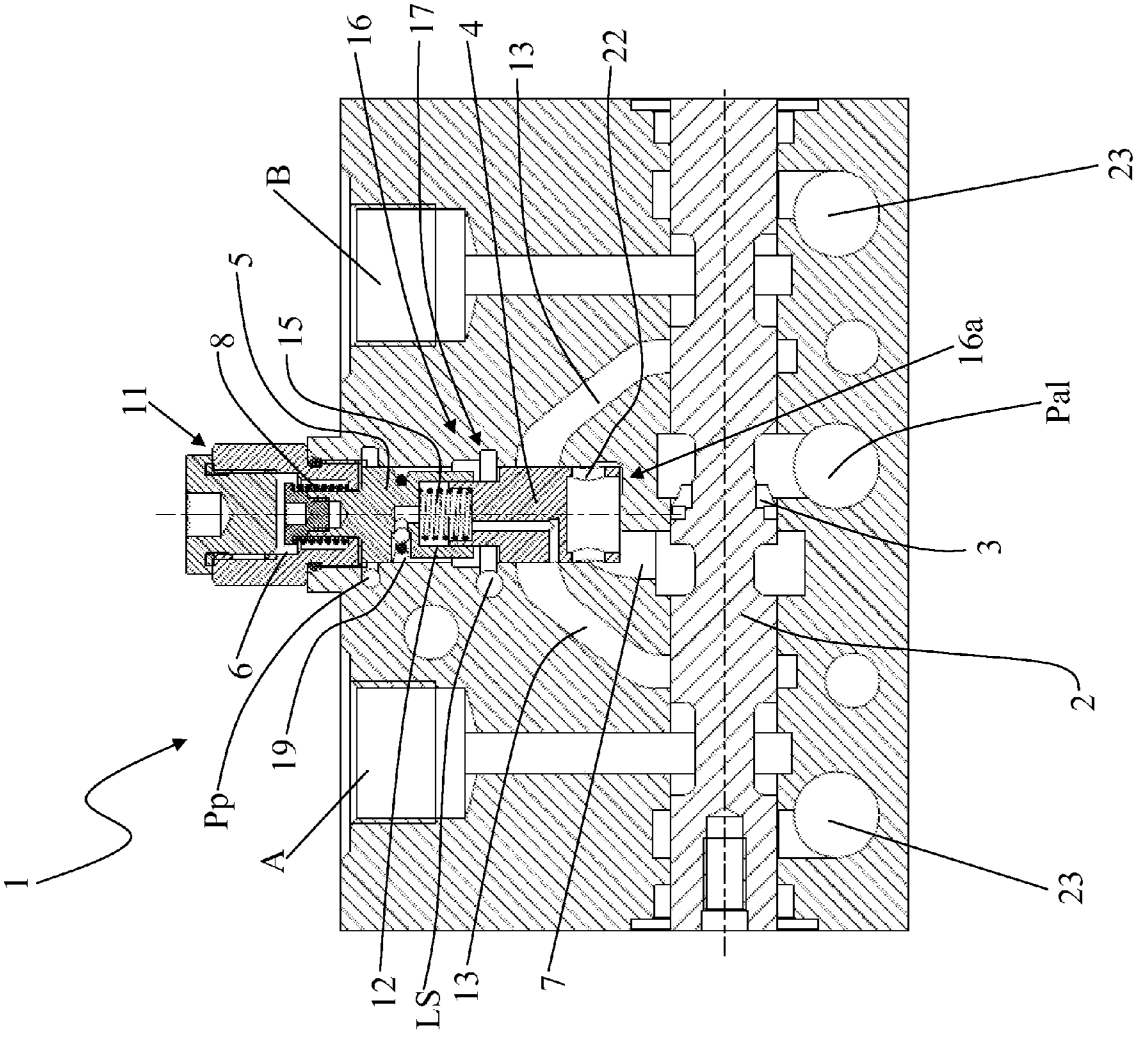
FIGS. 1 and 2 illustrate two different embodiments of a priority hydraulic section for load sensing applications, according to the present invention, in sectioned view.

With reference to FIGS. 1 and 2, a description in more detail is given below of the structure of a priority hydraulic section 1. Preferably, in the priority hydraulic section 1, the compensation means 16 comprise a pressure compensator 4 and a piston 5 disposed in such a way as to be adjacent in an internal proximity zone 17. In particular, the pressure compensator 4 extends from the internal proximity zone 17 up to the first end 16*a*. The piston 5, on the other hand, extends from the internal proximity zone 17 up to the second end 16*b*. In particular, the pressure compensator 4 and the piston 5 are housed in a common bore 9 formed within hydraulic section 1. Preferably, the piston 5 and the pressure compensator 4 are placed side by side so as to form, in the internal proximity zone 17, an intermediate chamber 12 suitable for communicating with the main spool 2 via a passage bridge 13. As specified above, the predefined channel Pp and the line LS for detecting the highest load pressure are isolated from each other, irrespective of the position taken by the piston 5 within the common bore 9.

The second chamber 6 houses a first spring 8 which is operatively active on the piston 5 in such a way as to move it away from said pressure compensator 4. Preferably, in the embodiments here described and illustrated, the pressure compensator 4 and the piston 5 are pushed away from each other by a second spring 15, of negligible force, housed in the intermediate chamber 12. In particular, the presence of the second spring 15 ensures the assumption of a predetermined position by the pair "pressure compensator 4—piston 5" in the absence of pressure. To close the common bore 9, a plug 11 is provided which, interfacing with the piston 5, forms the second chamber 6. In this way, the plug 11 and the piston 5 are elastically coupled together by means of the first spring 8. Between the plug 11 and the piston 5 however a passage is provided which allows communication between the second chamber 6 and the predefined channel Pp. The piston 5 is therefore subject, over a surface which interfaces with the plug 11, to the pressure of the fluid from the predefined channel Pp. Preferably, the piston 5 is provided with a valve 14 in order to establish selective communication between the line LS for detecting the highest load pressure and the intermediate chamber 12. The intermediate chamber 12 is, in its turn, subjected to the pressure of the passage bridge 13. The valve 14 is located within an annular interspace 19 formed between the piston 5 and the common bore 9. Preferably, the valve 14 is of the ball type, maintained within the annular interspace 19 by means of an elastic element 21.

Alternatively, the selective communication between the line LS for detecting the highest load pressure and the intermediate chamber 12 can be created solely by the seal exerted by the elastic element 21 against the annular interspace 19.

The operation of the priority hydraulic section for load sensing applications, according to the present invention, is described below.

The main spool 2 is displaceable between a neutral position, in which it does not communicate with the first chamber 7, and an operative position, in which it communicates with said first chamber 7, transmitting to it, through the metering orifice 3, the pressurised hydraulic fluid coming from the feed line Pal. When the main spool 2 is in the neutral position, the passage bridge 13 does not communicate with the workports A, B. When, however, the main spool 2 is in the operative position, the passage bridge 13 is put into communication with one of the workports A, B.

If the pressure in the line LS for detecting the highest load pressure is greater than the pressure in the intermediate chamber 12, the valve 14 closes off communication between this line LS for detecting the highest load pressure and the intermediate chamber 12 itself. If, however, the pressure in the line LS for detecting the highest load pressure is lower than the pressure in the intermediate chamber 12, the valve 14 opens communication between this line LS for detecting the highest load pressure and the intermediate chamber 12 itself. In practice, the pressure present at one of the workports A, B is transmitted, via the passage bridge 13 and the intermediate chamber 12, to the line LS for detecting the highest load pressure.

When the main spool 2 is in the operative position and the valve 14 is open, the pressure of the hydraulic fluid coming from the feed line Pal increases until the sum of the pressure exerted in the first chamber 7 and the equivalent pressure of the first spring 8 equals the value of the pressure in the predefined channel Pp in such a way that the pressure compensator 4 is thrust towards the piston 5, thus enabling the opening of communication between the first chamber 7 and the passage bridge 13.

The pressure compensator 4 is equipped, at its first end 16*a*, with regulating orifices 22. These regulating orifices 22 are preferably radial holes or notches. The displacements of the pressure compensator 4 within the bore 9 determine a proportional increase or decrease in the passage clearance generated by said regulating orifices 22 between the first chamber 7 and the bridge 13. It follows that, when the main spool 2 is in operative position, the flow delivered to the workports A, B will be substantially constant because it is dependent only on the load generated by the first spring 8.

When the main spool 2 is in the operative position, if the pressure of hydraulic fluid in the passage bridge 13 is greater than the pressure of hydraulic fluid coming from the feed line Pal, and therefore than the pressure acting in the first chamber and in the second chamber 6, the piston 5 is maintained in contact with the plug 11 and the pressure compensator 4 is moved away from the piston 5 until communication is closed between the first chamber 7 and the passage bridge 13. Consequently, the valve 14 opens. In these conditions, the reverse flow from the workports A, B to the feed line Pal is thus obstructed.

Conversely, if the pressure of hydraulic fluid coming from the feed line Pal is greater than the pressure of hydraulic fluid in passage bridge 13, the piston 5 and the pressure compensator 4 are thrust into contact with each other in the internal proximity zone 17 and the compensator 4 opens communication between the first chamber 7 and the passage bridge 13, taking a position depending on the equilibrium between the pressure of the predefined channel line Pp and the sum of the pressure exerted in the first chamber 7 and of the equivalent pressure of the first spring 8.

In the alternative embodiment illustrated in FIG. 2, a drainage channel 18 is formed in the main spool 2, suitable for effecting selective communication between the passage bridge 13 (and therefore the intermediate chamber 12) and a discharge channel 23 of hydraulic section 1. When the main spool 2 is in the neutral position and the passage bridge 13 communicates with the discharge channel 23 through the drainage channel 18, the pressurised fluid coming from the predefined channel Pp pushes the piston 5 closer to the pressure compensator 4 in said internal proximity zone 17, overcoming the resistance of the first spring 8 and the second spring 15 (if present). This ensures a predetermined position for the pressure compensator 4 in the absence of a manoeuvre. When the main spool 2 is in the operative position, said communication between the discharge channel 23 and the passage bridge 13, through the drainage channel 18, is interrupted.

The operation of the multiple hydraulic distributor, according to the present invention, is described below.

Consider, for simplicity, a hydraulic distributor 10 having a single priority section 1, while all the remaining sections 1 are of the flow-sharing type. The predefined channel Pp crosses all hydraulic sections 1, both the priority one and the flow-sharing ones. If the priority section 1 is the one with the greatest load, it will be precisely this one which transmits the regulating signal to a regulating organ 20 of the pump 100 (or alternatively to a three-way compensator of the inlet cover). In particular, the pressure in the line LS for detecting the highest load pressure (of the priority section 1) is transmitted to the regulating organ 20 of the pump 100 (or to the three-way compensator of the inlet cover) and to the second chamber 6 of all the flow-sharing hydraulic sections.

Conversely, if it is one of the flow-sharing sections which is operating with the greatest load, the valve 14 in the priority section 1 closes off communication between the line LS for detecting the highest load pressure and the intermediate chamber 12. In both cases, the compensator 4 of the priority section 1 assumes a position such that the pressure drop between the second chamber 6 and the first chamber 7, and equivalently between the feed line Pal and the first chamber 7, is maintained substantially equal to that corresponding to the load on the first spring 8. It is therefore evident that in the priority section 1, the positions of the compensator 4 and of the piston 5 depend solely on the load on the first spring 8. As a consequence, when the main spool 2 is in the operative position, the flow delivered to the workports A, B is kept substantially constant.

The characteristics of the hydraulic section for load sensing applications, and of the multiple hydraulic distributor, are clear from the description given above, as also are the advantages.

In particular, the proposed hydraulic section proves to be universal, i.e. usable both as a flow-sharing section and as a priority section. In fact, all the sections (both flow-sharing and priority) of the distributor are crossed by the predefined channel; however this channel is connected to the second chamber in the priority sections, while it is isolated in the flow-sharing sections. Constructively, the design and construction of the proposed hydraulic section are simplified by comparison with the current state of the art because it is sufficient to prepare a single type of section and make different internal connections to pass from flow-sharing operation to priority operation. In fact, in the case of a flow-sharing section, the compensation means are inserted into the appropriate bore, and then the bore itself is closed with the plug. Since a portion of the plug goes to cover the predefined channel, this channel is effectively unused and does not communicate with the second chamber. In the case of a priority section, instead, the pair pressure compensator-piston are inserted into the common bore, and then the common bore is closed with the plug. In this case, the plug does not reach as far as covering the predefined channel, which communicates instead with the second chamber created by the coupling between piston and plug.

Clearly, the constructional simplification corresponds to a considerable saving in time and costs compared with hydraulic sections in the known art.

Furthermore, both in the priority and in the "with check function" flow-sharing section, reverse flows from the workports to the pump are avoided. In particular, in the priority section, if the pressure in the passage bridge (and therefore to the workports) were to exceed the value of the pressure in the feed line, the intermediate chamber would be subjected to a pressure greater than that of the first and second chamber, thus causing the piston and the pressure compensator to mutually move apart, until communication was shut off between the passage bridge and the first chamber.

Furthermore, the designed check function is integrated into the compensation function, avoiding the need to provide dedicated additional elements (e.g. check valves).

Given the constructional simplification of the hydraulic sections, even the multiple hydraulic distributor here proposed proves to be simpler and less expensive than the hydraulic distributors in the known art. Finally, since all the sections (priority and flow-sharing) have the same overall dimensions, they can easily be packed so as to optimise the volume occupied, thus making it possible to obtain a very compact hydraulic distributor.

The invention claimed is:

1. A hydraulic section (1) for use in a hydraulic distributor (10), comprising:

a main spool (2) longitudinally displaceable within said hydraulic section (1) in order to selectively transmit pressurised hydraulic fluid coming from a feed line (Pal) of a pump (100) to workports (A,B) through a metering orifice (3);

pressure compensation means (16) situated downstream of said main spool (2) and able to maintain a substantially constant pressure drop through said metering orifice (3), said pressure compensation means (16) comprising a pressure compensator (40; 4) housed in a bore (9) formed within the hydraulic section (1);

a first chamber (7) interposed between said main spool (2) and a first end (16*a*) of said compensation means (16);

a second chamber (6) situated at a second end (16*b*), opposite said first end (16*a*) of said compensation means (16), characterised in that said second chamber (6) is connectable to the feed line (Pal) by means of a predefined channel (Pp) so that said hydraulic section (1) operates as a priority section, and it is connectable to a line (LS) for detecting the highest charge pressure so that said hydraulic section (1) operates as a flow-sharing section, wherein a plug (110; 11) is provided to close said bore (9), in case the hydraulic section (1) operates as a flow-sharing section the plug (110) interfacing with the walls of the bore (9) thus forming the second chamber (6) and a portion of said plug (110) covering the predefined channel (Pp) thus excluding the communication between the predefined channel (Pp) and the second chamber (6), in case the hydraulic section (1) operates as a priority section the plug (11) interfacing with a piston (5) housed within the bore (9) thus forming the second chamber (6) so that a passage is provided between the plug (11) and the piston (5) that allows the communication between the predefined channel (Pp) and the second chamber (6).

2. Hydraulic section (1) according to claim 1, wherein said predefined channel (Pp) and said line (LS) for detecting the highest charge pressure are isolated from each other.

3. Hydraulic section (1) operating as a priority section according to claim 1, wherein said compensation means (16) comprise a pressure compensator (4) and a piston (5) disposed in such a way as to lie adjacent in an internal proximity zone (17), said compensator (4) extending from said internal zone (17) up to said first end (16*a*) and said piston (5) extending from said internal zone (17) up to said second end (16*b*).

4. Hydraulic section (1) operating as a priority section according to claim 3, wherein said main spool (2) is displaceable between a neutral position, in which it does not communicate with said first chamber (7), and an operative position, in which it communicates with said first chamber (7) so as to transmit, through the metering orifice (3), the pressurised hydraulic fluid coming from the feed line (Pal).

5. Hydraulic section (1) operating as a priority section according to claim 3, wherein said pressure compensator (4) and said piston (5) are housed in a common bore (9).

6. Hydraulic section (1) operating as a priority section according to claim 5, wherein said piston (5) and said pressure compensator (4) are placed side by side so as to define, in said internal proximity zone (17), an intermediate chamber (12) suitable for communicating with said main spool (2) via a passage bridge (13).

7. Hydraulic section (1) operating as a priority section according to claim 6, wherein, with the main spool (2) in the neutral position, said passage bridge (13) does not communicate with the workports (A,B), whereas with the main spool (2) in the operative position said passage bridge (13) communicates with the workports (A,B).

8. Hydraulic section (1) operating as a priority section according to claim 6, further comprising a first spring (8) housed in said second chamber (6) and operatively active on said piston (5) so as to move it away from said pressure compensator (4).

9. Hydraulic section (1) operating as a priority section according to claim 8, further comprising a plug (11) serving to close said common bore (9), said plug (11) interfacing with said piston (5) in such a way as to define said second chamber (6) so that the plug (11) and the piston (5) are elastically coupled together by means of the first spring (8).

10. Hydraulic section (1) operating as a priority section according to claim 8, wherein said piston (5) is provided with a valve (14) in order to establish selective communication between the line (LS) for detecting the highest charge pressure and said intermediate chamber (12).

11. Hydraulic section (1) operating as a priority section according to claim 10, wherein said valve (14) closes off communication between said line (LS) for detecting the highest charge pressure and said intermediate chamber (12) if the pressure in the line (LS) for detecting the highest charge pressure is greater than the pressure in the intermediate chamber (12), whereas said valve (14) opens communication between the line (LS) for detecting the highest charge pressure and the intermediate chamber (12) if the pressure in the line (LS) for detecting the highest charge pressure is lower than the pressure in the intermediate chamber (12).

12. Hydraulic section (1) operating as a priority section according to claim 11, wherein, with said main spool (2) in the neutral position and said passage bridge (13) communicating with a discharge channel (23) of the hydraulic section (1) through a drain channel (18) formed in the main spool (2), the pressurised fluid coming from the predefined channel (Pp) pushes the piston (5) closer to the pressure compensator (4) in said internal proximity zone (17), overcoming the resistance of the first spring (8).

13. Hydraulic section (1) operating as a priority section according to claim 10, wherein, with said main spool (2) in the operative position and said valve (14) open, the pressure of the hydraulic fluid coming from the feed line (Pal) increases until the sum of the pressure exerted in the first chamber (7) and the equivalent pressure of the first spring (8) equals the value of the pressure in the predefined channel (Pp) so that the pressure compensator (4) will be pushed toward the piston (5), thus enabling the opening of communication between said first chamber (7) and said passage bridge (13).

14. Hydraulic section (1) operating as a priority section according to claim 10, wherein, with said main spool (2) in the operative position, if the pressure of the hydraulic fluid in the passage bridge (13) is greater than the pressure of the hydraulic fluid coming from the feed line (Pal), and hence of the pressure acting in the first chamber (7) and in the second chamber (6), said piston (5) is maintained in contact with the plug (11), said pressure compensator (4) is moved away from said piston (5) so as to close off communication between said first chamber (7) and the passage bridge (13) and said valve (14) opens, whereas if the pressure of the hydraulic fluid coming from the feed line (Pal) is greater than the pressure of the hydraulic fluid in the passage bridge (13), the piston (5) and the pressure compensator (4) are pushed into mutual contact in said internal proximity zone (17) and said pressure compensator (4) opens the communication between said first chamber (7) and said passage bridge (13) assuming a position which will depend on the equilibrium between the pressure of the line of the predefined channel (Pp) and the sum of the pressure exerted in the first chamber (7) and the equivalent pressure of the first spring (8).

15. Hydraulic section (1) operating as a priority section according to claim 8, wherein said pressure compensator (4) and said piston (5) are pushed away from each other by a second spring (15) of negligible force housed in said intermediate chamber (12).

16. Hydraulic section (1) operating as a priority section according to claim 15, wherein, with said main spool (2) in the neutral position and said passage bridge (13) communicating with a discharge channel (23) of the hydraulic section (1) through a drain channel (18) formed in the main spool (2), the pressurised fluid coming from the predefined channel (Pp) pushes the piston (5) closer to the pressure compensator (4) in said internal proximity zone (17), overcoming the resistance of the first spring (8) and the second spring (15).

17. A hydraulic distributor (10) comprising a plurality of hydraulic sections (1) according to claim 1, wherein at least one of said hydraulic sections (1) is a priority section, said predefined channel (Pp) passing through all the hydraulic sections (1) of said hydraulic distributor (10) but communicating only with the second chamber (6) of said at least one priority hydraulic section (1).

* * * * *

UNITED STATES PATENT AND TRADEMARK OFFICE

CERTIFICATE OF CORRECTION

PATENT NO. : 8,646,338 B2
APPLICATION NO. : 13/058147
DATED : February 11, 2014
INVENTOR(S) : Luca Taddia It is certified that error appears in the above-identified patent and that said Letters Patent is hereby corrected as shown below:

On the Title page, in the left-hand column, in item (73), please delete “Emillia” and insert therefor --Emilia--.

Signed and Sealed this
Twenty-seventh Day of May, 2014

Michelle K. Lee
*Deputy Director of the United States Patent and Trademark Office*